(12) United States Patent
Marchand et al.

(10) Patent No.: US 12,401,638 B2
(45) Date of Patent: Aug. 26, 2025

(54) MANAGEMENT OF THE AUTHENTICATION OF A TERMINAL TO ACCESS A SERVICE OF A SERVICE PROVIDER

(71) Applicant: ORANGE, Issy-les-Moulineaux (FR)

(72) Inventors: Hervé Marchand, Chatillon (FR); Olivier Gaste, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 210 days.

(21) Appl. No.: 18/335,500

(22) Filed: Jun. 15, 2023

(65) Prior Publication Data
US 2023/0412590 A1 Dec. 21, 2023

(30) Foreign Application Priority Data
Jun. 16, 2022 (FR) .................................. 2205870

(51) Int. Cl.
*H04L 9/40* (2022.01)
(52) U.S. Cl.
CPC .......... *H04L 63/083* (2013.01); *H04L 63/102* (2013.01)
(58) Field of Classification Search
CPC .... H04L 63/083; H04L 9/3226; H04L 63/102
USPC ............................................................ 726/6
See application file for complete search history.

(56) References Cited

U.S. PATENT DOCUMENTS

| 10,275,580 B2 | 4/2019 | Aillery et al. | |
| 10,657,242 B1* | 5/2020 | Xia | H04L 9/0825 |
| 2012/0199647 A1 | 8/2012 | Hwang et al. | |
| 2013/0263286 A1 | 10/2013 | Aillery et al. | |
| 2014/0059657 A1* | 2/2014 | Barrett | G06F 21/33 726/4 |
| 2016/0036809 A1* | 2/2016 | Bhimanaik | H04L 63/102 726/4 |
| 2017/0012965 A1* | 1/2017 | Hurst | H04L 63/0892 |
| 2020/0233949 A1* | 7/2020 | Xia | H04W 12/08 |

FOREIGN PATENT DOCUMENTS

FR 2969437 A1 6/2012

OTHER PUBLICATIONS

French Search Report and Written Opinion dated Jan. 17, 2023 for corresponding French Application No. 2205870, filed Jun. 16, 2022.

* cited by examiner

*Primary Examiner* — Frantz B Jean
(74) *Attorney, Agent, or Firm* — David D. Brush; Westman, Champlin & Koehler, P.A.

(57) ABSTRACT

A method for authenticating a user of an application stored on a first terminal, able to communicate with a service provider through a first communication link. The provider requires authentication of the user of the application before a service is provided to the application. The Method includes: receiving a request to access an application stored on the first terminal; creating a code associated with the received access request; transmitting, by the first terminal, to an authenticated second terminal, via a second communication link, a request to provide authentication data via a second communication link, the request including the obtained code; receiving, via a third communication link, the input code and authentication data delivered by the second terminal; and transmitting the authentication data via the first link to the service provider if the received code corresponds to the transmitted code.

6 Claims, 2 Drawing Sheets

[Fig. 1]
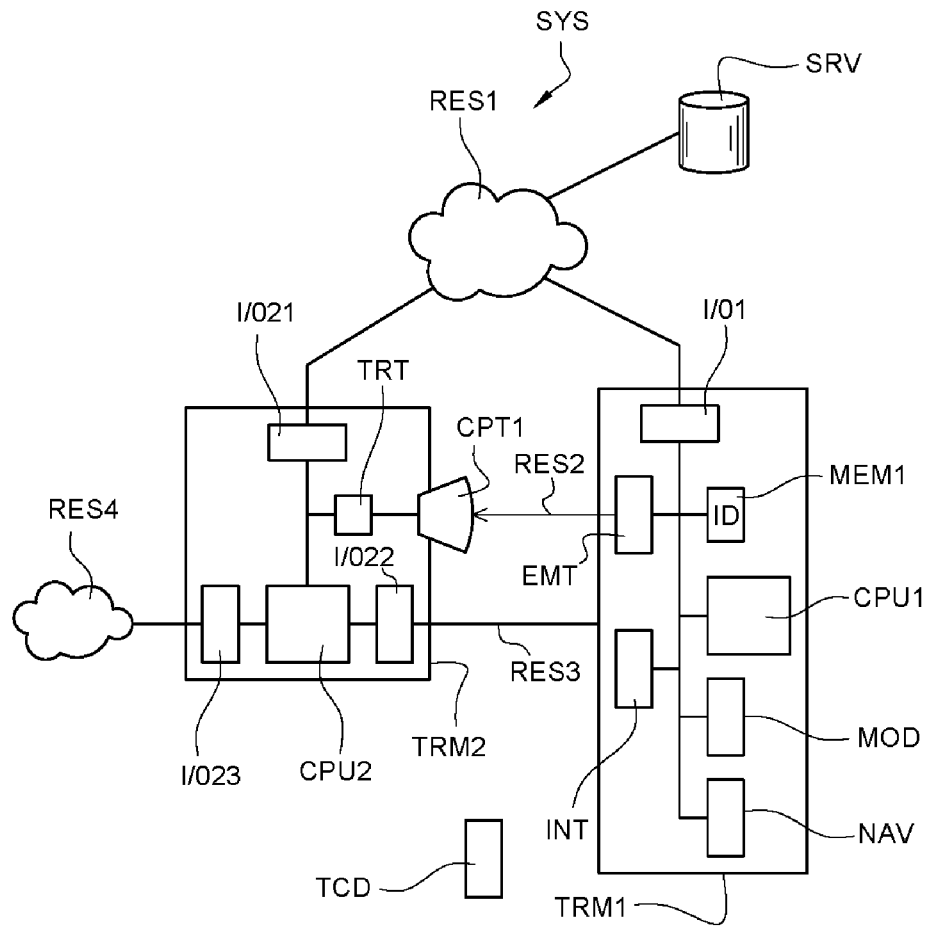
[Fig. 2]
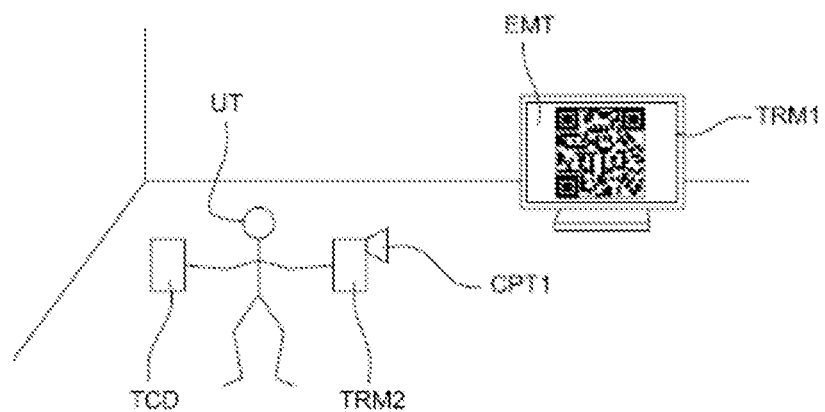

[Fig. 3]
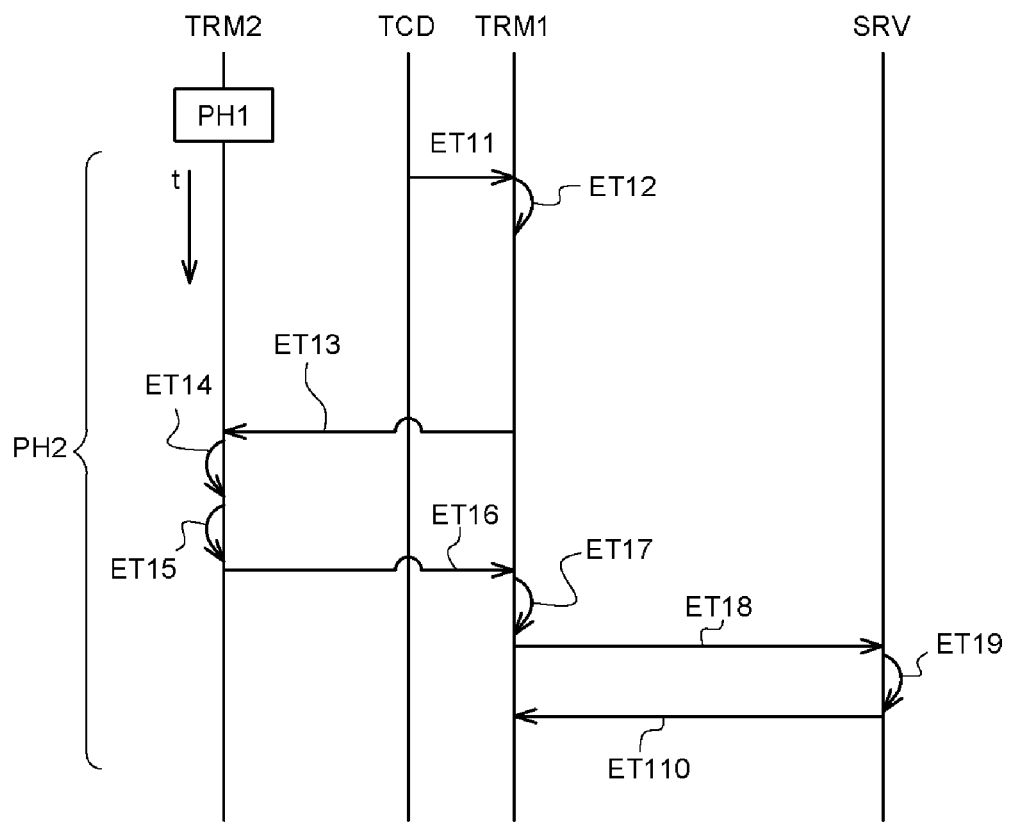

MANAGEMENT OF THE AUTHENTICATION OF A TERMINAL TO ACCESS A SERVICE OF A SERVICE PROVIDER

TECHNICAL FIELD

The present disclosure relates to a method for achieving authentication of a user of a terminal by a service provider.

The terminal in question is any device for processing data, i.e. any device equipped with hardware and/or software resources including at least one microprocessor, able to communicate through a communication link.

This communication link may for example be the Internet.

The present disclosure is most particularly applicable to terminals that do not have any means for inputting data, or to terminals that have such means but they are not at all or not very suitable for inputting authentication data. The terminal is, for example, a television set able to communication through a communication link such as the Internet.

The targeted terminals are also able to communicate data either via a display of data on a screen or via any other means of communication. When the data are displayed on a screen, said data may take the form of a QR code or of any other similar code (barcode, etc.).

BACKGROUND

All service providers offer to their clients access to personalized services. A personalized service is for example delivery of a multimedia content (film, music, etc.), delivery of an Internet page including data relating to the account of a client user, etc. This access requires authentication to be carried out.

To access the service, generally, the user uses a terminal equipped with means for inputting data, with which means she or he is able to input identification and/or authentication data such as an identifier and a password. On receipt, the provider verifies the identifier and the password and permits access to the service if they are correct.

The problem is that the terminal in question is not necessarily equipped with means for inputting data, or if it is equipped with such inputting means, the latter are not necessarily suitable for inputting authentication data.

If the terminal is not equipped with inputting means, the service cannot be accessed by this terminal because the provider has no means of authenticating the account holder who wants to use the terminal to access a service.

If the terminal is equipped with inputting means but the latter are not suitable for inputting authentication data, the service may be used via the terminal but only if a tedious process, which moreover is a source of errors, of inputting authentication data such as an identifier and a password, is completed. The inputting means are for example a remote control when the terminal is a television.

One solution consists in introducing, into the authentication method, a trusted terminal, typically a mobile telephone or a tablet, located nearby and having already undergone authentication. When access to a service is desired from a terminal, called the first terminal, the latter contacts the trusted terminal, called the second terminal, via a communication link and requires this second terminal to communicate an authentication datum to a mediation server.

More precisely, the steps are the following:

The mediation server, on request by the first terminal, and for example by an application installed in the terminal, generates a code, which is preferably single-use.

The mediation server transmits the code to the first terminal. The second terminal obtains the code, for example by photographing a 2D code, and transmits it accompanied by an authentication datum to the mediation server.

If the received code corresponds to a transmitted code, the mediation server stores the received pair and makes it available to the service provider.

In parallel, the TV service periodically verifies, by interrogating the mediation server, whether a received cookie is associated with a transmitted code.

The mediation server carries out the same steps on each request to access services by various first terminals. The number of codes generated and stored by the mediation server may therefore be high.

Because of this centralized management of the codes and of the high number of codes in use, the inventors have observed that there is a risk of an inadvertent user, or of a malicious user, inputting a code of another user. This user then accesses the service requested by this other user. This is unacceptable in terms of quality of service.

One or more aspects of the present disclosure aims to improve the situation.

SUMMARY

An aspect of the present disclosure relates to a method for achieving authentication of a user of an application stored on a terminal, called the first terminal, able to communicate with a service provider through a first communication link, said provider requiring an authentication of the user of the application before a service is provided to the application, characterized in that it comprises the following steps in the first terminal:

a. reception of a request to access an application stored on the first terminal;

b. creation of a code associated with the received access request;

c. transmission, by the first terminal, to an authenticated second terminal, via a second communication link, of a request to provide authentication data via a second communication link, the request including the obtained code;

d. reception, via a third communication link, of the input code and of authentication data delivered by the second terminal;

e. transmission of the authentication data via the first link to the service provider if the received code corresponds to the transmitted code.

According to an aspect of the present disclosure, the first terminal generates the code locally and communicates it to the second terminal; the first terminal receives in return the code from the second terminal after the code has been input on the second terminal. It is then enough for the first terminal to verify the received code, and, if it matches, the first terminal continues authentication with the provider. Because generation of the code is managed locally in the first terminal, and because in principle a single person executes the application to access the service, the risk mentioned in the section devoted to the prior art is greatly decreased or even removed altogether. Furthermore, transmission of the code, reception of the code input on the second terminal and its verification involves no device other than the first and second terminals; as the number of applications to access services at a given time may be very high, an aspect of the present disclosure prevents the first network from becoming overloaded.

According to a first embodiment of the method, the provision request comprises data relating to the third communication link to be used to transport the authentication data from the second terminal to the first terminal. This first embodiment is advantageous in the case where the second link is different from the third link. For example, the second communication link may be one-way; in this case the second terminal is informed of the type of link to be used to communicate the authentication data to the first terminal.

According to a particular second embodiment of the method, which may be implemented as an alternative or in addition to the previous one, the second link and the third link are of the same type. The first terminal and the second terminal communicate with each other via the same communication link; this avoids the need for the first terminal to provide any information other than the type of communication link to be used by the second terminal to communicate the authentication data and the code.

According to a particular third embodiment of the method, which may be implemented as an alternative or in addition to the previous ones, the first communication link is a display of data on a screen of the first terminal, said data being able to be captured by the second terminal.

According to one hardware aspect, the present disclosure relates to an entity for managing authentication of a user of an application stored on a terminal, called the first terminal, able to communicate with a service provider through a first communication link, said provider requiring an authentication of the user of the application before a service is provided to the application, characterized in that it comprises the following modules:
 a. a module for receiving a request to access an application stored on the first terminal;
 b. a first module for creating a code associated with the received access request;
 c. a module for transmitting, by the first terminal, to an authenticated second terminal, via a second communication link, a request to provide authentication data via a second communication link, the request including the obtained code;
 d. a second mode for receiving, via a third communication link, the input code and authentication data delivered by the second terminal;
 e. a module for transmitting the authentication data via the first link to the service provider if the received code corresponds to the transmitted code.

According to another hardware aspect, the disclosure relates to a reader terminal comprising a managing entity such as defined above.

According to another hardware aspect, one subject of the disclosure is a computer program able to be implemented on a managing entity such as defined above, the program comprising code instructions that, when it is executed by a processor, carries out the steps of the managing method that are defined above.

According to another hardware aspect, one subject of the disclosure is a data medium on which has been stored at least one sequence of program-code instructions for executing a managing method such as defined above.

The medium in question may be any entity or device capable of storing the program. For example, the medium may comprise a storage means, such as a ROM, a CD-ROM or a microelectronic-circuit ROM for example, or else a magnetic storage means, a hard disk for example. Moreover, the data medium may be a transmissible medium such as an electrical or optical signal, which may be routed via an electrical or optical cable, by radio or by other means. The program according to an aspect of the present disclosure may in particular be downloaded over an Internet link. Alternatively, the data medium may be an integrated circuit into which the program is incorporated, the circuit being configured to execute or to be used in the execution of the method in question.

BRIEF DESCRIPTION OF THE DRAWINGS

One or more aspects of the present disclosure will be better understood on reading the following description, which is given by way of example and with reference to the appended drawings, in which:

FIG. 1 shows an IT system in which one example of embodiment illustrating a method for achieving authentication according to the disclosure has been illustrated.

FIG. 2 shows a scene illustrating one non-limiting example of embodiment.

FIG. 3 is a schematic view of exchanges performed in relation to one example of embodiment.

DETAILED DESCRIPTION OF ILLUSTRATIVE EMBODIMENTS OF THE DISCLOSURE

An architecture for streaming a multimedia content will now be presented with reference to FIG. 1.

FIG. 1 shows a system SYS comprising a server SRV belonging to a service provider and a terminal TRM1, called the first terminal, the server and terminal being connected to each other by means of a communication link RES1, called the first link below, which is a network such as the Internet.

The system also comprises a second terminal TRM2. This second terminal TRM2 comprises means for achieving authentication, which are able to be authenticated by a server (not shown); this server is for example the server of a mobile telecommunications operator, which manages a mobile network referenced RES4.

The second terminal TRM2 is able to receive data delivered by the first terminal TRM1 via a second communication link RES2.

In the present example, this second link RES2 is, preferably, a short-range link. By short-range link, what is meant here is a link having a limited coverage distance-wise. In this context, the first terminal is able to communicate data under a given distance DIST via the second link RES2.

The coverage of the second link RES2 is chosen such that if communication is possible between two terminals by way of this second link, it is confirmation of the proximity of the two terminals in question and, implicitly, of the proximity of the user to the two terminals. The second link RES2 in question is for example an RFID link (RFID standing for Radio Frequency Identification) or a Bluetooth link.

It will be seen below that this second link RES2 may also consist of a visual-code generator and of an image-capturing device capable of taking an image of the code and of extracting information therefrom. An audio-capturing device or a light emitter may also be used as signal emitter, the code then being transmitted in the form of a sound or of light, respectively.

More generally, the first terminal TRM1 includes a transmitter able to transmit data-containing signals and the second terminal TRM2 includes a sensor able to capture the signals, for instance a microphone, a movement detector, or a light sensor.

The second terminal TRM2 is able to transmit data to the first terminal TR1 via a third communication link RES3. Just like the second link RES2, the third link RES3 is short-range.

The second link RES2 and the third link RES3 may be of same type or of different types.

An aspect of the present disclosure will be illustrated by means of an example. In this example, with reference to FIGS. 1 and 2, the first terminal TRM1 is a television comprising a first microprocessor CPU1 able to communicate with a module MOD able to generate:
informational data QRC,
a code to be input ODT (see FIG. 2).

The informational data QRC may take the form of a visual code such as a QR code, QR codes being known to those skilled in the art. The data could also be transmitted via audio signals or light signals able to convey data.

It will be recalled here that a 2D code is a pictogram, generally in black and white, that contains information.

The code to be input ODT is a code allowing the first terminal TRM1, when the latter transmits a request associated with this code, to subsequently identify the reply associated with the request, said reply containing the code.

The first microprocessor CPU1 is also able to communicate with a first memory MEM1 able to store the code to be input.

The first microprocessor CPU1 is also able to communicate with rendering means EMT, which may be used to render the informational data taking the form of a QR code and the code to be input. In the present example, the rendering means are a screen. Aspect of the present disclosure are not limited to this type of rendering means. As indicated above, an audio emitter could also be used to transmit a signal representing a code.

The first microprocessor CPU1 is also able to communicate with optional interfacing means INT, and to communicate with a remote control TCD able to emit commands via a keyboard comprising selectable buttons. The buttons especially allow television channels to be selected, etc.

Naturally, the present disclosure is not limited to terminals equipped with a remote control, but encompasses any type of terminal whether equipped with a means of control or not.

The first microprocessor CPU1 is also able to communicate with input/output means I/O1 to achieve communication over the first link.

The first terminal TRM1 also comprises an application that may be executed in order to access a service provided by a service provider. The service in question is for example a service providing access to video contents.

It will be seen that access to the service requires authentication of the user of the application.

In the present example, the second terminal TRM2 is a mobile telephone or tablet or any other similar device capable of being authenticated by a service. This second terminal is equipped, in the present example, with an SIM card (SIM standing for Subscriber Identity Module). This module is able to authenticate the user of the second terminal relatively to a mobile communication network. The authentication of the second terminal will not be described in more detail because it is irrelevant to the description of the present disclosure.

For the sake of simplicity of the description, in the present text the user is said to achieve authentication via the terminal, although that is not really the case. Specifically, strictly speaking the authentication regards the SIM card and not the user. However, generally, since each SIM card belongs to one and only one user, authentication of the card will therefore also amount to authentication of the user.

The telephone TRM2 further comprises a microprocessor CPU2, called the second microprocessor, able to communicate with processing means TRT connected to means CPT1 for receiving signals such as image-capturing means; the receiving means are for example a camera, a microphone, an accelerometer, or a light sensor; the processing means are for their part, for example, an application program.

The second microprocessor CPU2 is also able to communicate with input/output means I/O21 that are able to receive and send data over the first link RES1.

The second microprocessor CPU2 is also able to communicate with input/output means I/O23 to achieve communication with the third link RES4.

The second microprocessor CPU2 is also able to communicate with input/output means I/O22 to achieve communication between the second terminal and the first terminal.

It will be noted that the storage means (MEM1 in the first terminal and MEM2 in the second terminal) described above may be of any kind; these means are for example a Flash memory, RAM, etc.

In the present example, the system also comprises an entity ENT capable of generating 2D codes on request. This entity is, in the present example, installed in the first terminal; the entity may also be located outside of the first terminal and, in this particular case, the entity is for example accessible via the first link RES1 via a uniform resource locator (URL), i.e. over the Internet.

The system also comprises a service provider SRV such as a telecommunication operator providing services such as access to a zone, access to multimedia contents, etc. To provide these services, the provider SRV has at its disposal IT resources such as a server. This server is, in the present example, connected to the first communication link RES1, i.e. to the Internet.

In the present example, the first terminal TRM1 and the provider SRV are therefore connected to each other via the Internet.

In the following examples, the first terminal TRM1 and the second terminal TRM2 are considered not to be paired. The two terminals therefore do not know, in this sense, whether the other terminal is equipped with means for recognizing other terminals. In the present example, the first terminal has no means of detecting second terminals in its field of coverage. In addition, only second terminals are able to receive a signal delivered by a first terminal TRM1. The present disclosure is not limited to this example. Even though it is not particularly advantageous, aspect s of the present disclosure may naturally be implemented on paired terminals capable of communicating with each other.

An example illustrating a method of an exemplary embodiment is described below. FIG. 2 illustrates a schematic showing a scene. In this scene, a user is standing in a room, equipped with her or his telephone TRM2. In this room there is a television TRM1 that is connected to the Internet. As was seen above, the television comprises an interface INT that is manipulatable via a remote control TCD. The remote control comprises buttons allowing selection of commands that are able to be sent to the television set TRM1 for processing.

The aim is for the user to be authenticated by the service provider SRV in order that she or he may receive personalized services, such as the ability to use a service on the first terminal TRM1.

This example of embodiment comprises two phases, referenced PH1 and PH2:
a first phase PH1 in which the user of the telephone is authenticated, for example by a telecommunication operator, via the second terminal, and for example via a SIM card included in the terminal; and a second phase PH2 in which the authentication data associated with the first phase are used to authenticate the television TRM1.

It will be noted that the first phase may be carried out before the second phase or during the second phase.

In the first phase PH1, the user is authenticated by way of the telephone TRM2. As a result thereof, a proof of authentication, in the present example a cookie, is stored in the second memory MEM2. The user of the telephone may subsequently use this proof to use on-line services on the television when the service provider recognizes the proof in question as sufficient proof.

It will be recalled here that, in information technology, a cookie is defined by the HTTP communication protocol as being a data sequence sent by an HTTP server to an HTTP client, that the latter returns on each interrogation of the same HTTP server under certain conditions. The cookie is sent in the HTTP header by the web server to the web browser that returns it unchanged each time it access the server. A cookie may be used for authentication, a session (state maintenance), and to store information specific to the user.

The second phase PH2 is divided into a plurality of steps ET11 to ET113. These steps are described with reference to FIG. 3, in which axes TRM2/TCD/TRM1/SRV have been shown that illustrate the exchange of data that occurs between the first terminal, the remote control, the second terminal, and the provider, respectively. In FIG. 3, a time axis indicates the order of execution of the steps, an exchange of data being symbolized by an arrow having an origin and an end, the origin being associated with the sender of a message, the end being associated with the recipient of the message. Thus, an arrow having an origin and an end on the same axis represents processing internal to the device.

In a first step ET11, the user UT uses the remote control TCD and selects a command CDE1, called the first command, able to order execution of an application and therefore delivery of a request for authentication, with a view to use the corresponding service hosted by the service provider. At this time, the first microprocessor receives the command CDE1 via the interface INT.

In a second step ET12, the first microprocessor CPU1 requires creation:
of a 2D code including information that will allow the second terminal to communicate with the first terminal, with a view to communicating authentication data;
and of a code ODT similar to a PIN code (example: 421); this code ODT will need to be input on the second terminal TRM2, as will be seen below.

In the present example, in a third step ET13, the first terminal TRM1 displays, on the screen, the 2D code and the code to be input on another terminal, here the second terminal.

It will be understood that, if the system comprises a plurality of first terminals, each first terminal manages, independently of the others, the creation of the codes. In this way, as an application is executed by a single user, and as a single code is created for the targeted application, an incorrectly input code will cause the authentication method to stop short.

In a third step ET13, in the present example, the user uses her or his telephone and photographs the 2D code displayed on the screen EMT.

In a fourth step ET14, the image-capturing means CPT1 capture the photograph, and transmit it, in a fifth step ET15, to the processing means TRT. The processing means decode the 2D code and deduce information therefrom. The aim of this information is to get the first terminal to transmit data proving the authentication carried out by the second terminal to the first terminal TRM1.

In the present example, according to one variant, the request further includes an indication of the particular type of link to be used to transmit the authentication data.

In a sixth step ET16, the second microprocessor CPU2 takes into account the type of communication link specified in the received request and transmits the cookie via this communication link.

In this step ET16, the code ODT displayed on the screen of the first terminal TRM1 is input on the second terminal TRM2 and also transmitted with the cookie.

If the communication link is not active, the second microprocessor activates this link and transmits the authentication datum and the code input, in the present example the cookie and the code ODT.

In a seventh step ET17, the first terminal TRM1 receives the cookie and the code ODT and stores this information in memory MEM1.

In an eighth step ET18, the first terminal TRM1 compares the transmitted code ODT and the received code that was input on the second terminal TRM2.

If they match, the first terminal TRM1 transmits the received cookie to the provider SRV.

If the codes do not match, the method terminates.

If the codes match, in a ninth step ET19, the provider SRV receives the cookie as proof of authentication and provides the service to the first terminal in a tenth step ET110 if the cookie is accepted as proof of authentication of the user UT.

According to one variant of the embodiment described above, after the 2D code has been captured, and in response, the second terminal, if it is not equipped with a communication link such as indicated in the 2D code, transmits a message requesting another link or a plurality of other links. On receipt, the first terminal replies indicating at least one other communication link for the transmission of the cookie.

In order to carry out the method, the managing entity comprises:
a. a module for receiving a request to access an application stored on the first terminal;
b. a first module for creating a code associated with the received access request;
c. a module for transmitting, by the first terminal, to an authenticated second terminal (TRM2), via a second communication link (RES2), a request to provide authentication data via a second communication link, the request including the obtained code;
d. a second mode for receiving, via a third communication link, the input code and authentication data delivered by the second terminal;
e. a module for transmitting the authentication data via the first link to the service provider if the received code corresponds to the transmitted code.

It will lastly also be noted here that the term "entity" or "module" may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

Although the present disclosure has been described with reference to one or more examples, workers skilled in the art will recognize that changes may be made in form and detail without departing from the scope of the disclosure and/or the appended claims.

The invention claimed is:

1. A method for achieving authentication of a user of an application stored on a first terminal, able to communicate with a service provider through a first communication link, said provider requiring an authentication of the user of the application before a service is provided to the application, wherein the method is implemented in the first terminal and comprises:
   receiving a request to access the application stored on the first terminal;
   creating a code associated with the received access request;
   transmitting, by the first terminal, to an authenticated second terminal, via a second communication link, a request to provide authentication data via a second communication link, the request including the created code and data relating to a third communication link to be used to transport the authentication data from the second terminal to the first terminal;
   receiving, via the third communication link, the input code and the authentication data delivered by the second terminal; and
   transmitting the authentication data via the first link to the service provider in response to the received code corresponding to the created and transmitted code.

2. The method according to claim 1, wherein the second link and the third link are of a same type.

3. The method according to claim 1, wherein the first communication link is a display of data on a screen of the first terminal, said data being able to be captured by the second terminal.

4. An entity for managing authentication of a user of an application stored on a first terminal, able to communicate with a service provider through a first communication link, said provider requiring an authentication of the user of the application before a service is provided to the application, wherein the entity comprises:
   at least one processor; and
   at least one non-transitory computer readable medium comprising instructions stored thereon which when executed by the at least one processor configure the entity to:
      receive a request to access the application stored on the first terminal;
      create a code associated with the received access request;
      transmit, by the first terminal, to an authenticated second terminal, via a second communication link, a request to provide authentication data via a second communication link, the request including the created code and data relating to a third communication link to be used to transport the authentication data from the second terminal to the first terminal;
      receive, via the third communication link, the input code and the authentication data delivered by the second terminal;
      transmit the authentication data via the first link to the service provider in response to the received code corresponding to the created and transmitted code.

5. A reader terminal comprising entity defined in claim 4.

6. A non-transitory computer readable data medium on which at least one sequence of program-code instructions has been stored, which when executed by at least one processor of a first terminal, configure the first terminal to implement a method of authenticating a user of an application stored on the first terminal, which is able to communicate with a service provider through a first communication link, said provider requiring an authentication of the user of the application before a service is provided to the application, wherein the method comprises:
   receiving a request to access the application stored on the first terminal;
   creating a code associated with the received access request;
   transmitting, by the first terminal, to an authenticated second terminal, via a second communication link, a request to provide authentication data via a second communication link, the request including the created code and data relating to a third communication link to be used to transport the authentication data from the second terminal to the first terminal;
   receiving, via the third communication link, the input code and the authentication data delivered by the second terminal; and
   transmitting the authentication data via the first link to the service provider in response to the received code corresponding to the created and transmitted code.

* * * * *